United States Patent
Ukai et al.

(10) Patent No.: US 9,016,914 B2
(45) Date of Patent: Apr. 28, 2015

(54) LIGHT SOURCE UNIT ASSEMBLY

(75) Inventors: Yasuhiro Ukai, Kasugai (JP); Hiroyasu Tahara, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 293 days.

(21) Appl. No.: 13/609,769

(22) Filed: Sep. 11, 2012

(65) Prior Publication Data

US 2013/0094233 A1    Apr. 18, 2013

(30) Foreign Application Priority Data

Oct. 13, 2011 (JP) ................. 2011-225778

(51) Int. Cl.
*F21V 9/00* (2006.01)
*B60Q 3/00* (2006.01)
*B60Q 3/02* (2006.01)

(52) U.S. Cl.
CPC ............ *B60Q 3/004* (2013.01); *B60Q 3/0203* (2013.01); *B60Q 3/0216* (2013.01)

(58) Field of Classification Search
USPC ......... 362/488, 501, 511, 551, 491, 546, 548, 362/549, 489
See application file for complete search history.

(56) References Cited

U.S. PATENT DOCUMENTS

| | | | | |
|---|---|---|---|---|
| 4,430,692 | A * | 2/1984 | Papadakis | 362/500 |
| 5,184,883 | A * | 2/1993 | Finch et al. | 362/511 |
| 6,070,998 | A * | 6/2000 | Jennings et al. | 362/501 |
| 7,699,511 | B2 * | 4/2010 | Kawaji et al. | 362/494 |
| 7,712,933 | B2 * | 5/2010 | Fleischmann et al. | 362/511 |
| 8,356,921 | B2 * | 1/2013 | Fujita | 362/501 |
| 8,545,070 | B2 * | 10/2013 | Sakiyama et al. | 362/494 |
| 8,616,740 | B2 * | 12/2013 | Anderson et al. | 362/487 |
| 8,807,806 | B2 * | 8/2014 | Hayashi et al. | 362/501 |
| 2003/0081423 | A1 * | 5/2003 | Shinji et al. | 362/511 |
| 2009/0027914 | A1 * | 1/2009 | Wu | 362/555 |
| 2011/0058385 | A1 * | 3/2011 | Kazaoka et al. | 362/540 |
| 2011/0228549 | A1 * | 9/2011 | Lindsay et al. | 362/555 |

FOREIGN PATENT DOCUMENTS

| | | |
|---|---|---|
| JP | 2008-143425 | 6/2008 |
| JP | 2010-124291 | 6/2010 |

OTHER PUBLICATIONS

U.S. Appl. No. 13/470,585 to Nobuki Hayashi, filed May 14, 2012.
Chinese Office action dated Oct. 8, 2014, along with an English-language translation thereof.
Japanese Office action having mail date of Mar. 5, 2015, along with an English-language translation thereof.

* cited by examiner

*Primary Examiner* — John A Ward
(74) *Attorney, Agent, or Firm* — Greenblum & Bernstein, P.L.C.

(57) ABSTRACT

A light source unit assembly includes a light source, a light guide member, a light source housing member housing the light source, a light guide member holder, and a mounting member. The light guide member includes a light entrance portion and a light exit portion from which the light entering the light entrance portion exits. The light guide member holder supports an end portion of the light guide member including the light exit portion. The mounting member is provided to a vehicular interior part and each of the light source housing member and the light guide member holder is independently mounted to the mounting member. Each of the light source housing member and the light guide member holder has a connecting portion with which the light source housing member and the light guide member holder are connected to each other such that the light entrance portion faces the light source.

18 Claims, 11 Drawing Sheets

LIGHT SOURCE UNIT ASSEMBLY

CROSS REFERENCE TO RELATED APPLICATION

This application claims priority from Japanese Patent Application No. 2011-225778 filed on Oct. 13, 2011. The entire contents of the priority application are incorporated herein by reference.

FIELD OF THE INVENTION

The present disclosure relates to a light source unit assembly.

BACKGROUND OF THE INVENTION

A light source unit that is provided in an interior part of a vehicle includes an LED unit (a light source) and a light guide member that guides light from the LED unit to illuminate surroundings thereof. In the light source unit, the LED is housed in the LED unit and an end portion of the light guide member is inserted to a connecting portion of the LED unit.

Usually, the light source and the light guide member are integrally provided as the light source unit first, and then, the light source unit is mounted to an interior part of a vehicle. However, the light source unit integrally including the light source and the light guide member is relatively great in size and this causes problems in easy handling and deteriorates operability in mounting of the light source unit. After the light source and the guide member are integrally provided as the light source unit, the light source unit is mounted to the interior part of a vehicle. Therefore, an order of the mounting steps for mounting the light source unit to the interior part is not freely determined.

SUMMARY OF THE INVENTION

The present invention has been made in view of the aforementioned circumstances. An objective of the present invention is to provide a light source unit assembly in which each of a light source and a light guide member is independently mounted to an interior part of a vehicle and thereby providing the light source and the light guide member as a unit.

A technology described herein relates to a light source unit assembly. The light source unit assembly includes a light source, a light guide member, a light source housing member, a light guide member holder, and a mounting member. The light guide member includes a light entrance portion which light from the light source enters and a light exit portion from which the light entering the light entrance portion exits. The light source housing member houses the light source. The light guide member holder supports an end portion of the light guide member including the light exit portion. The mounting member is provided to a vehicular interior part and each of the light source housing member and the light guide member holder is independently mounted to the mounting member. Each of the light source housing member and the light guide member holder has a connecting portion with which the light source housing member and the light guide member holder are connected to each other such that the light entrance portion faces the light source.

DETAILED DESCRIPTION OF THE PREFERRED EMBODIMENTS

One embodiment will be explained with reference to FIGS. 1 to 9. A vehicular door trim 10 (a vehicular interior part) is an interior part that is to be mounted to an inner panel on its compartment inner side. The door trim 10 and the inner panel configure a vehicular door.

Figure 1:
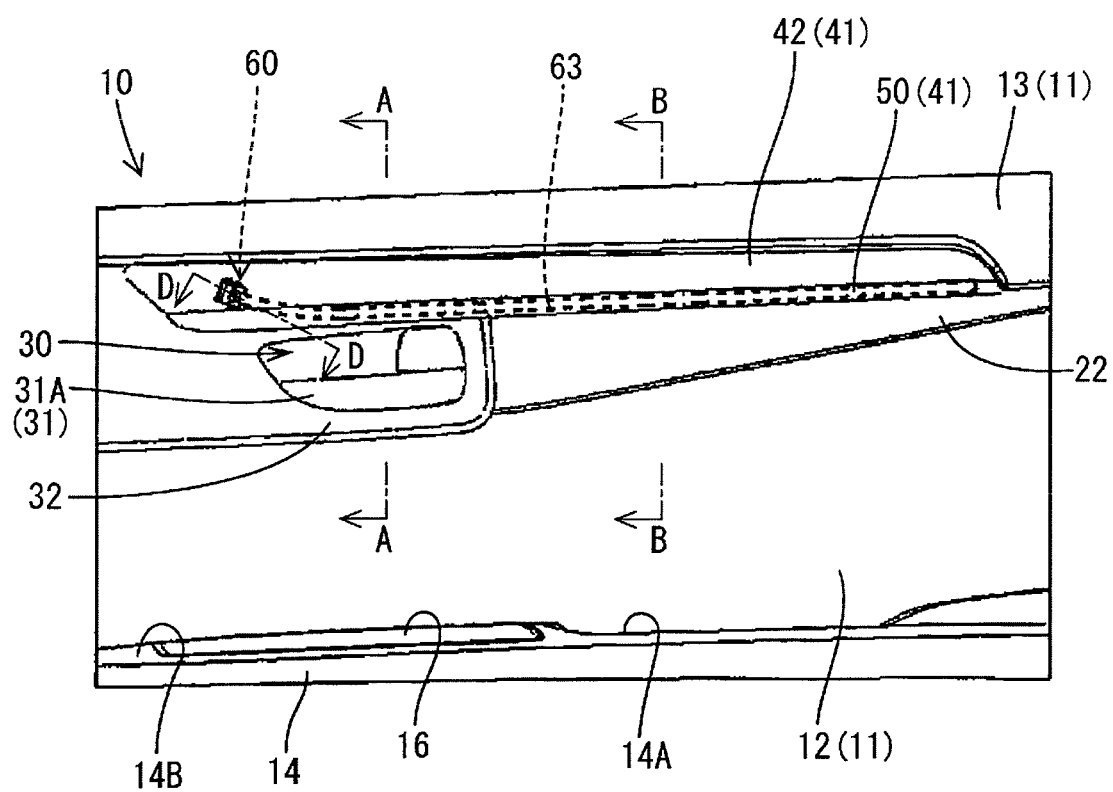
FIG. 1 is a front view of a part of a vehicular door trim having a light source unit according to one embodiment.

The door trim 10 improves visual quality and comfort of a vehicle compartment. The door trim 10 includes a trim board 11 and a decorative panel 41. As illustrated in FIG. 1, the trim board 11 includes a main body 12 and an upper board 13 that is provided on an upper side of the main body 12. The trim board 11 is not necessarily configured by two separate components including the main body 12 and the upper board 13 but may be formed from one integral component with molding.

The main body 12 and the upper board 13 are connected to each other in a following method for example. A boss (not illustrated) that is formed on one of the main body 12 and the upper board 13 is inserted to a through hole (not illustrated) that is formed in the other one of the main body 12 and the upper board 13. Thereafter, a distal end portion of the boss is welded with a welding method such as welding by ultrasonic waves. The main body 12 and the upper board 13 are connected to each other by various connecting methods using screws or projection fitting.

The lower board 11 is formed from a synthetic resin such as polypropylene or a material obtained by mixing a synthetic resin and natural fibers (such as kenaf fibers). A skin (not illustrated) is adhered to a part or an entire area of a vehicle compartment inner side of the trim board 11.

As illustrated in FIG. 1, the main body 12 includes an armrest 14 that is used as an armrest for a passenger. The armrest 14 is projected to an inner side of the vehicle compartment. An upper surface 14B of the armrest 14 horizontally extends. An opening 14A is formed on the upper surface 14B so as to be open upwardly. The opening 14A is used as a pull handle (not illustrated). A passenger puts his/her fingers in the pull handle to open and close the vehicular door.

A handle housing portion 30 is provided on a portion of the trim board 11 that is close to a connecting portion of the upper board 13 and the main body 12. An inside handle 31, or more specifically a holding portion 31A of the inside handle 31, is housed in the handle housing portion 30. The inside handle 31 is operated to open and close the vehicular door. A switch base 16 including a switch operating portion (not illustrated) is provided on a portion of the upper surface 14B of the armrest 14 that is located on a lower side of the handle housing portion 30.

Figure 2:
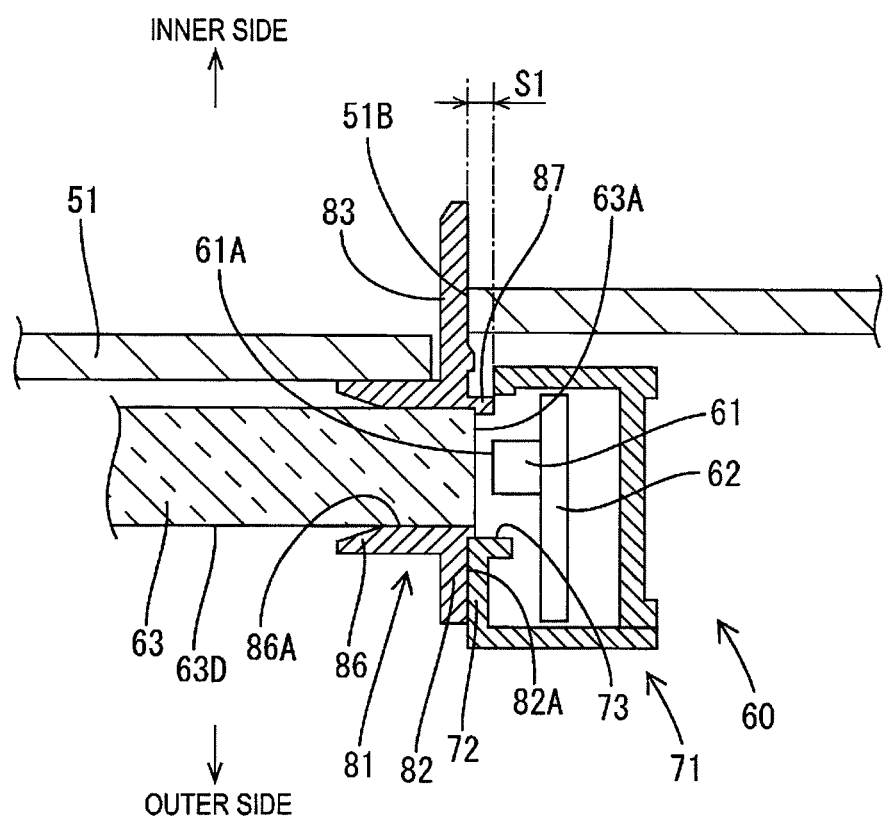
FIG. 2 is a cross-sectional view illustrating a light source unit taken along a D-D line in FIG. 1.
Figure 6:
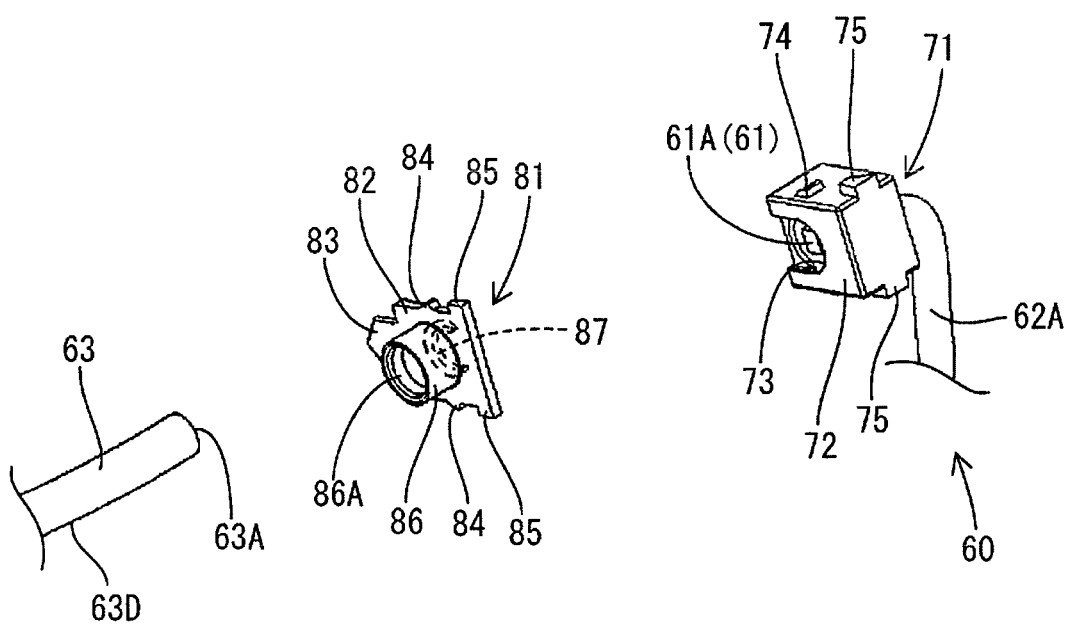
FIG. 6 is an exploded perspective view of the light source unit in FIG. 1.

As illustrated in FIGS. 2 and 6, the light source unit 60 includes an LED 61 (a light source), a light guide member 63 (a light exit member) that guides light emitted from the LED 61, an LED housing member 71 that houses the LED 61, and a light guide member holder 81 that supports and fixes an end portion of the light guide member 63.

As illustrated in FIG. 2, the LED 61 is mounted on an LED board 62 and the LED board 62 is housed in the LED housing member 71. The LED 61 is connected to a power source device (not illustrated) such as a battery via an electric line 62A illustrated in FIGS. 5 and 6. The power source device is mounted to a vehicle.

The light guide member 63 is formed to have substantially a circular cross section and configured with a flexible light guide material formed in an elongated bar-like shape. The "light guide material" is a material through which light passes and light can be guided within the material. An example of the light guide material is an acrylic resin. Known light guide materials disclosed in Japanese Published Application Nos. 2005-306233 and 6-75120 can be used as the light guide material of the present embodiment.

As illustrated in FIG. 2, one end portion of the light guide member 63 in its longitudinal direction is mounted to the light guide member supporting holder 81. An end surface 63A of the one end portion close to the LED 61 faces a light emitting surface 61A of the LED 61. The end surface 63A of the one end portion is a light entrance surface (a light entrance portion) which light emitted from the LED 61 enters.

An outer peripheral surface 63D (a side surface) of the light guide member 63 is covered with a fluorine resin and with this configuration, light guided into the light guide member 63 is exited outside. The light entering the end surface 63A of the light guide member 63 totally reflects repeatedly within the light guide member 63 to be guided through the light guide member 63. Thereafter, the light is exited from an entire surface area of the outer peripheral surface 63D. With this configuration, the whole light guide member 63 functions as a linear light source that can illuminate its surroundings. Namely, the outer peripheral surface 63D of the light guide member 63 is a light exit surface (a light exit portion) through which light entering through the end surface 63A into the light guide member 63 exits outside of the light guide member 63.

As illustrated in FIG. 1, the light source unit 60 including the LED housing member 71, the light guide member holder 81 and the LED 61 is provided in an end portion of the decorative panel 41 close to a front side of a vehicle. An inside handle bezel 32, the handle housing portion 30 and a surface 22 of the main body 12 that is to be illuminated are provided along a front-rear direction of a vehicle. The decorative panel 41 extends in the front-rear direction of the vehicle. The light guide member 63 also extends in the front-rear direction of the vehicle and extends over a total length of the handle housing portion 30 and the surface 22. With this configuration, the light exited from the light guide member 63 illuminates the handle housing portion 30 and the surface 22 over an entire length thereof. The surface 22 to be illuminated is referred to a surface of the main body 12 that faces an inner space of the compartment. The light is emitted from the light source unit 60 and guided through the light guide member 63 and exited therefrom, and the surface 22 is irradiated with the light exited from the light guide member 63. The surface 22 is a light receiving portion.

Figure 3:
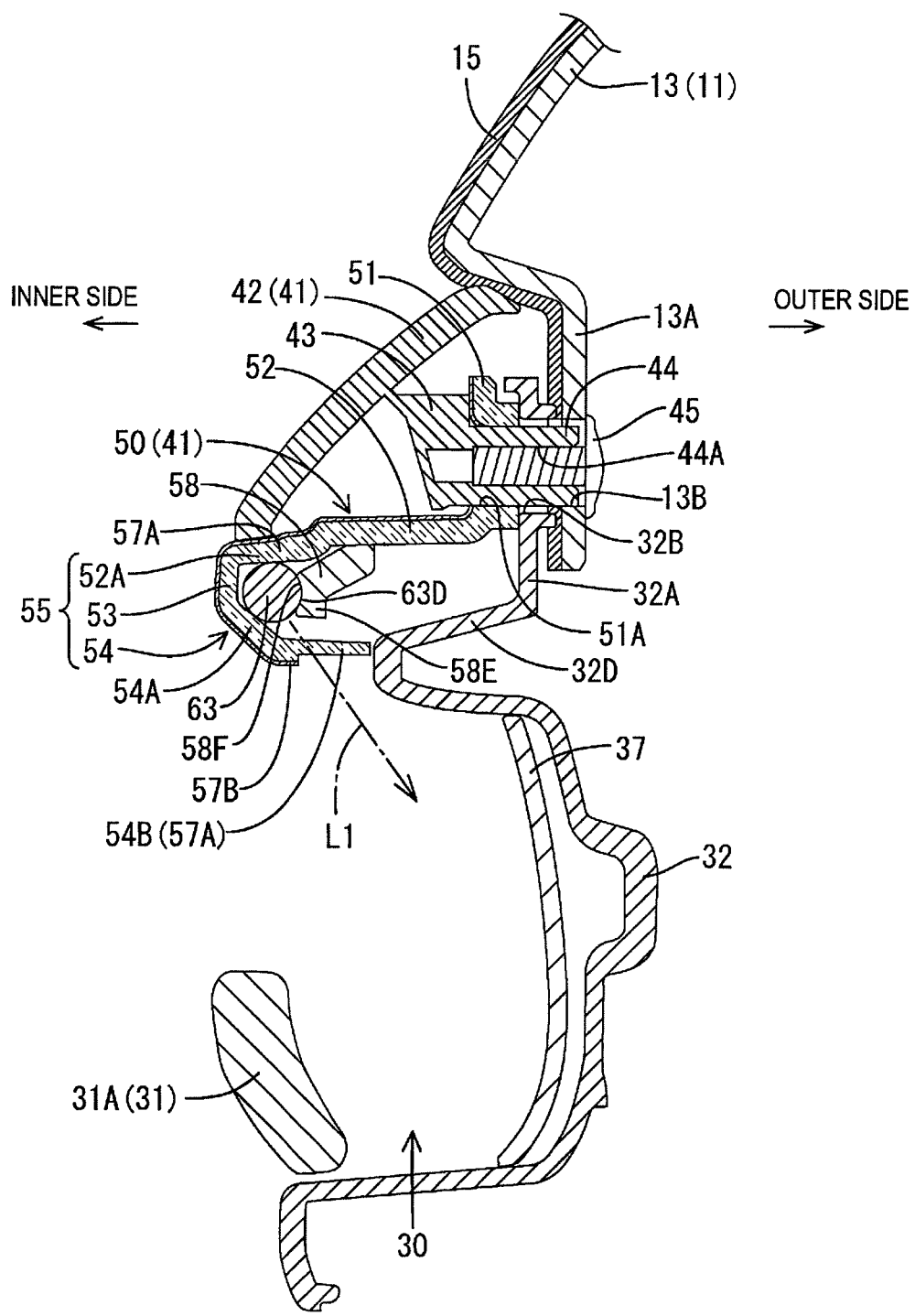
FIG. 3 is a cross-sectional view illustrating the vehicular door trim taken along an A-A line in FIG. 1.
Figure 4:
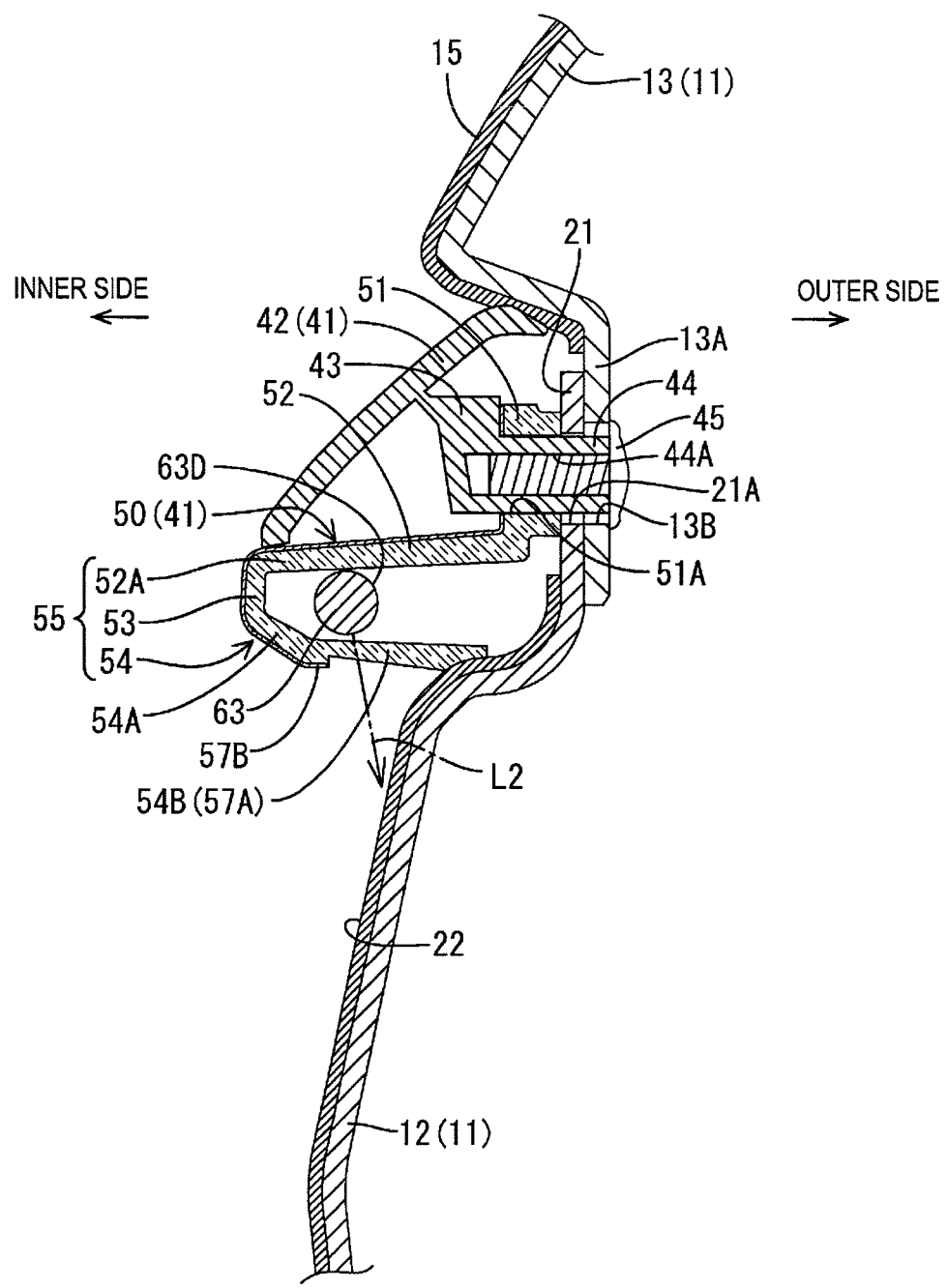
FIG. 4 is a cross-sectional view illustrating the vehicular door trim taken along a B-B line in FIG. 1.

A configuration of the decorative panel 41 will be explained. As illustrated in FIGS. 3 and 4, the decorative panel 41 is provided on an upper side of the inside handle 31 and on an upper side of the surface 22 of the main body 12. A lower end portion 13A of the upper board 13 is projected to the outer side of the compartment to form a step and an upper end portion 32A of the bezel 32 is projected to the outer side of the compartment to form a step. The steps form a housing portion at a contact portion of the upper board 13 and the bezel 32 and a part of the decorative panel 41 is housed in the housing portion.

As illustrated in FIG. 1, the decorative panel 41 extends along the vehicle front-rear direction and includes an upper panel 42 and a lower panel 50. The upper panel 42 forms an upper portion of the decorative panel 41 and the lower panel 50 forms a lower portion of the decorative panel 41. As illustrated in FIG. 3, the upper panel 42 is bent upwardly toward the outer side of the compartment (a right side in FIG. 3). The lower panel 50 is provided between the upper panel 42 and the bezel 32 (or the surface 22 of the main body 12).

As illustrated in FIG. 3, a flange 43 extends from a surface of the upper panel 42 that is on the outer side of the compartment. The flange 43 includes a mounting boss 44 that is formed in substantially a cylindrical shape and projected to the outer side of the compartment. An insertion hole 13B is formed in the lower end portion 13A of the upper board 13 so as to be penetrated therethrough in a width direction of a vehicle. An insertion hole 32B is formed in the upper end portion 32A of the bezel 32 so as to be penetrated therethrough in the width direction of a vehicle. An insertion hole 51A is formed in the upper end portion 51 of the lower panel 50 so as to be penetrated therethrough in the width direction of a vehicle.

The mounting boss 44 is inserted through the insertion hole 51A, the insertion hole 32B, and the insertion hole 13B. A screw insertion hole 44A is formed in the mounting boss 44 along a center axis of the mounting boss 44 so as to open toward the outer side of the compartment. The mounting boss 44 is inserted through the insertion hole 51A, the insertion hole 32B, and the insertion hole 13B in this order from an inner side of the compartment. Thereafter, the screw 45 is inserted to the screw insertion hole 44A from the outer side of the compartment. Accordingly, the decorative panel 41 including the upper panel 42 and the lower panel 50 is attached to the upper board 13 and the bezel 32. The mounting bosses 44, the insertion holes 51A, the insertion holes 32B and the insertion holes 13B are provided in the front-rear direction of a vehicle.

As illustrated in FIG. 4, the mounting boss 33 is provided on an upper side of the surface 22 of the main body 12, and an insertion hole 21A is formed in the upper end portion 21 of the main body 12. The mounting boss 33 is inserted through the insertion hole 21A. The mounting boss 44 is inserted through the insertion hole 51A, the insertion hole 21A and the insertion hole 13B in this order. Thereafter, the screw 45 is inserted to the screw insertion hole 44A from the outer side of the compartment to fix the mounting boss 44.

As illustrated in FIG. 3, the lower panel 50 includes an upper wall 52, a side wall 53 and a lower wall 54. The upper wall 52 extends substantially horizontally from a lower end of the upper end portion 51 to the inner side of the compartment. The side wall 53 extends downwardly from the end portion of the upper wall 52 on the inner side of the compartment. The lower wall 54 extends from the lower end portion of the side wall 53 toward the outer side of the compartment.

The distal end portion 52A of the upper wall 52, the side wall 53 and the lower wall 54 form a projected wall portion 55 that is projected further to the inner side of the compartment than the upper wall 32D of the bezel 32. The distal end portion 52A corresponds to a portion of the upper wall 52 that is closer to the inner side of the compartment than the upper wall 32D of the bezel 32. The projected wall portion 55 is formed to have substantially a U-shaped cross section and is open to the outer side of the compartment. The projected wall portion 55 extends along the front-rear direction of a vehicle. A space is formed within the projected wall portion 55 and surrounded by the projected wall portion 55. The elongated light guide member 63 is housed in the space within the projected wall portion 55 so as to extend along the front-rear direction of a vehicle or the extending direction in which the projected wall portion 55 extends.

Specifically, the light guide member 63 is provided on a surface of the projected wall portion 55 on the outer side of the compartment or provided at the projected end of the lower panel 50. The side wall 53 is provided to cover the light guide member 63 from the inner side of the compartment and configure a surface of the decorative panel 41 that faces the compartment. The lower wall 54 configures a lower surface of the decorative panel 41 and is provided to cover the light guide member 63 from the lower side. A portion of the lower wall 54 that is provided on a front side of the compartment configures the handle housing portion 30 with the bezel 32.

As illustrated in FIG. 3, a light guide member fixing member 58 (a light exit member fixing member) is attached to the lower panel 50. The light guide member fixing member 58 presses the light guide member 63 from the outer side of the compartment and fix it. The light guide member fixing member 58 is formed in substantially a plate shape and an end portion of the light guide member fixing member 58 close to the inner side of the compartment is a contact portion 58E that is in contact with the light guide member 63. The light guide member fixing member 58 including the contact portion 58E extends along a longitudinal direction of the light guide member 63 (in the front-rear direction of a vehicle), and presses an entire length of the light guide member 63 from the outer side of the compartment.

A recess 58F is formed on a surface of the contact portion 58E that faces the light guide member 63. The recess 58F is recessed to correspond to an outer peripheral surface 63D of the light guide member 63. A part of the light guide member 63 is fitted to the recess 58F and this surely fixes the light guide member 63.

The lower wall 54 of the lower panel 50 includes an inclined portion 54A and a lighting portion 54B. The inclined portion 54A is inclined such that an end thereof opposite to a basal end connected to the side wall 53 extends downwardly to be close to the outer side of the compartment. The lighting portion 54B extends substantially horizontally from the end of the inclined portion 54A opposite to the basal end (a lower end of the inclined portion 54A). The light exited from the light guide member 63 passes through the lighting portion 54B toward the handle housing portion 30. The lighting portion 54B is provided on the lower wall 54 of the projected wall portion 55 that faces the inside handle 31.

In the present embodiment, the lower panel 50 is configured with a base member 57A and a light blocking layer 57B. The base member 57A is made of a synthetic resin material having high light transmission or high transparency such as acrylic or polycarbonate. The light blocking layer 57B covers a surface of the base member 57A that faces the inner side of the compartment. No light blocking layer 57B is formed on the lighting portion 54B, and the base member 57A corresponding to the light blocking portion 54B does not include the light blocking layer 57B. Accordingly, the light transmits through the lighting portion 54B towards the handle housing portion 30. Namely, at least a part of the end portion of the decorative panel 41 close to the outer side of the compartment is formed of a material having high light transmission and forms the lighting portion 54B. The lighting portion 54B is integrally formed with the lower panel 50.

The light blocking layer 57B is formed by coating the surface of the base member 57A with a material having a light blocking property or adhering a film having a light blocking property to the surface of the base member 57A. The light blocking layer 57B may be formed by coating with plating and this improves design. However, examples of the light blocking layer 57B is not limited thereto and the light blocking layer 57B may be formed with any other methods as long as it has a light blocking property.

In the present embodiment, as illustrated in FIG. 3, the light guide member 63 is provided in the lower panel 50 and provided on the inner side of the compartment (the left side in FIG. 3) than the lighting portion 54B. The light guide member 63 and the inside handle 31 are provided on substantially a same vertical line. Namely, the light blocking layer 57B is provided between the light guide member 63 and the inside handle 31.

The light guide member fixing member 58 has a surface in white that is a light reflecting surface. The contact portion 58E of the light guide member fixing member 58 is provided to cover the light guide member 63 from the outer side of the compartment. The light guide member fixing member 58 is provided such that a space is formed between a lower surface of the contact portion 58E and the lighting portion 54B.

With this configuration, the light exited from the outer peripheral surface 63D of the light guide member 63 having a light axis L1 in FIG. 3 passes through the space between the contact portion 58E and the lighting portion 54B and reaches the lighting portion 54B. The light that reaches the lighting portion 54B passes through the lighting portion 54B toward the handle housing portion 30.

The lighting portion 54B is formed to extend along a longitudinal direction of the inside handle 31 that is the front-rear direction of a vehicle. With this configuration, the linear light that is exited from the light guide member 63 and passes through the lighting portion 54B enables an entire length of the inside handle along the front-rear direction of a vehicle to be visible. As illustrated in FIG. 4, the lighting portion 54B of the lower panel 50 extends to reach the upper portion of the surface 22 of the main body 12. Accordingly, the surface 22 of the main body 12 is illuminated with the light exited from the light guide member 63 having the light axis L2 in FIG. 4.

Next, configurations of the LED housing member 71 and the light guide member holder 81 of the light source unit 60 of the present embodiment and amounting configuration of the light source unit 60 and the decorative panel 41 will be explained.

As illustrated in FIGS. 2 and 6, the LED housing member 71 is formed in substantially a box shape that can house the LED 61 therein. An opening 73 is formed through a wall 72 of the LED housing member 71 that faces the light emitting surface 61A of the LED 61 and also faces the light guide member holder 81. The opening 73 is formed to correspond to the light emitting surface 61A of the LED 61 and light emitted from the LED 61 is exited to the light guide member 63 through the opening 73.

The light guide member holder 81 is formed in a plate-like shape and includes a plate portion 82 and a cylindrical portion 86. The plate portion 82 is provided to cover the wall 72 and the opening 73 of the LED housing member 71 and the cylindrical portion 86 is projected from the plate portion 82.

The end portion of the light guide member 63 that is close to the LED 61 and has the light entrance portion is fitted to and inserted in a mounting hole 86A of the cylindrical portion 86. Accordingly, the light guide member holder 81 supports the end portion of the light guide member 63. As illustrated in FIG. 2, at the distal end portion of the cylindrical portion 86, an inner diameter of the mounting hole 86A increases as is close to the distal end thereof. With this configuration, the light guide member 63 is easily inserted to the cylindrical portion 86.

Figure 5:
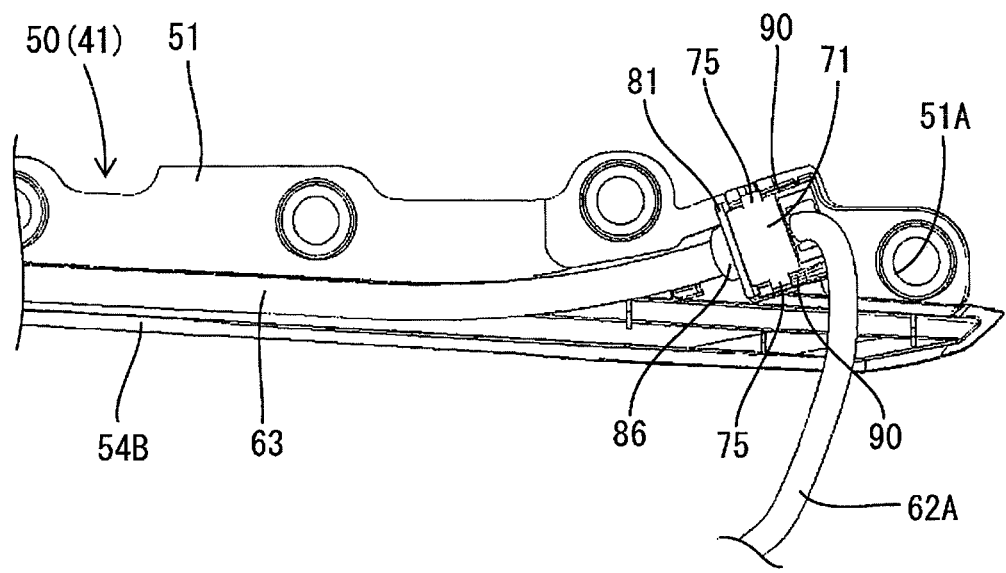
FIG. 5 is a view illustrating the light source unit seen from an outer side of a vehicular compartment.
Figure 7:
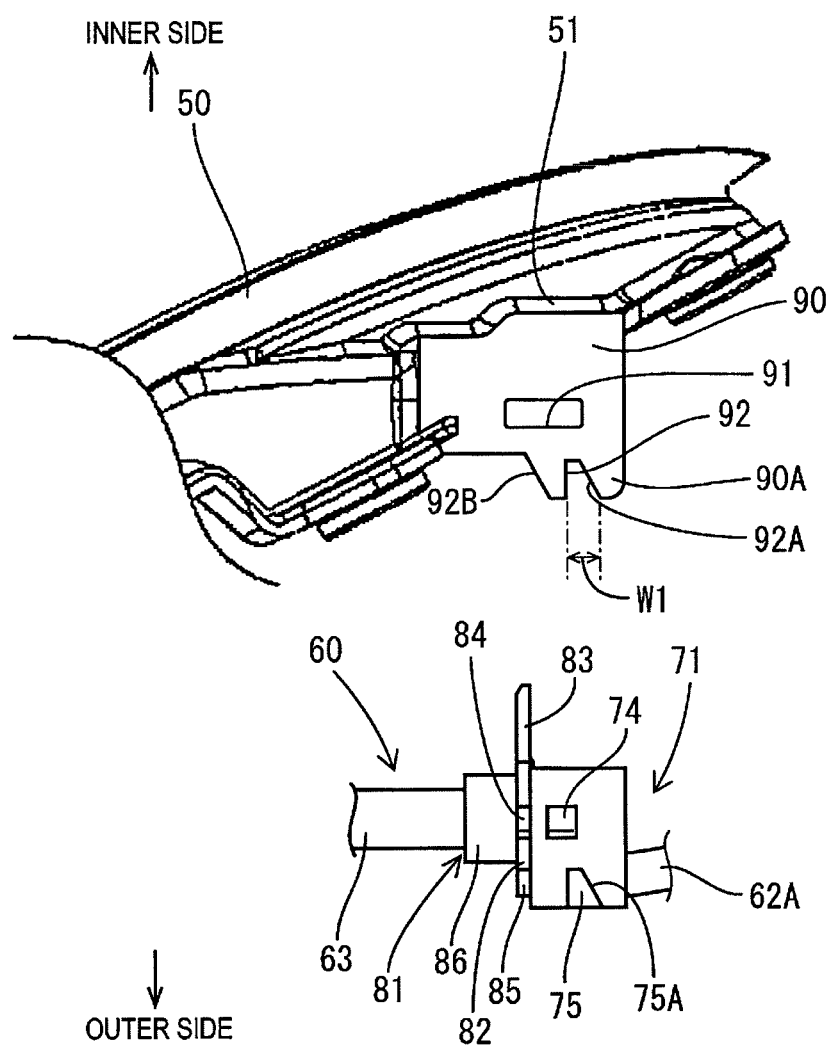
FIG. 7 is a view illustrating the light source unit and a mounting rib that is provided to a lower panel.

As illustrated in FIGS. 5 and 7, a pair of mounting ribs 90 (mounting member) are provided on the upper end portion 51 of the lower panel 50 such that a part of each mounting rib 90 is projected to the outer side of the compartment. Each of the mounting ribs 90 may be integrally formed with the upper end portion 51 or may be attached to the upper end portion 51. As illustrated in FIG. 5, the mounting ribs 90 are provided to sandwich the LED housing member 71 and the light guide member holder 81 therebetween. The LED housing member 71 and the light guide member holder 81 are inserted to a space between the mounting ribs 90 from the outer side of the compartment to be fixed to the mounting ribs 90 independently from each other. The space is formed between the mounting ribs 90 and an opening communicated with the space is formed between the mounting ribs 90 on a side opposite to the lower panel 50. The LED housing member 71 and the light guide member holder 81 are inserted to the space from the opening formed by the mounting ribs 90.

Figure 9:
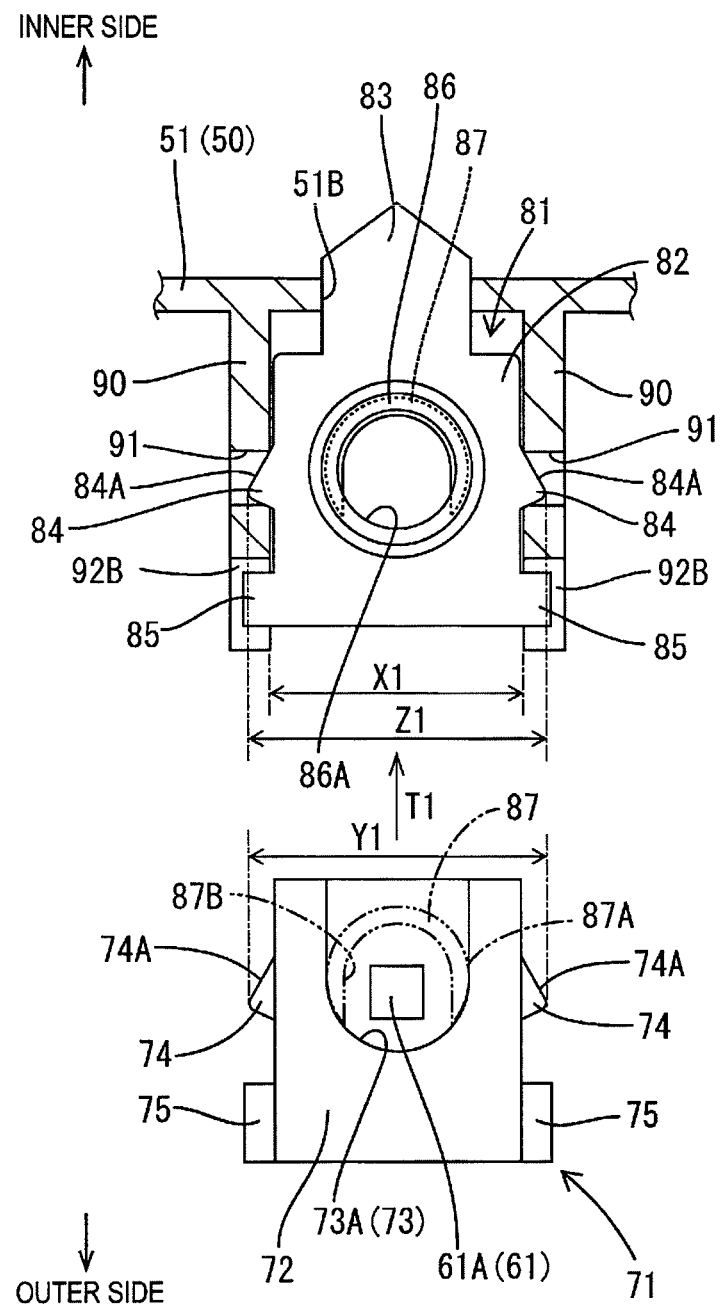
FIG. 9 is a view illustrating a light guide member holder mounted to the mounting rib.

As illustrated in FIGS. 7 and 9, a fitting hole 91 is formed in each of the mounting ribs 90 so as to be through a thickness of each mounting rib 90. The fitting hole 91 is formed in a rectangular shape elongated in a direction in which the LED housing member 71 and the light guide member holder 81 are arranged (a left-right direction in FIG. 7). The fitting hole 91 is formed in a rectangular shape elongated in a direction substantially perpendicular to an insertion direction in which the LED housing member 71 and the light guide member holder 81 are inserted to the space between the mounting ribs 90 from its opening. A housing member fitting projection 74 (a housing member fitting portion) is formed to be projected from each side surface of the LED housing member 71 that faces each of the mounting ribs 90. A holder fitting projection 84 (a holder fitting portion) is formed to be projected from each side surface of the light guide member holder 81 (the plate portion 82) that faces each of the mounting ribs 90.

Figure 8:
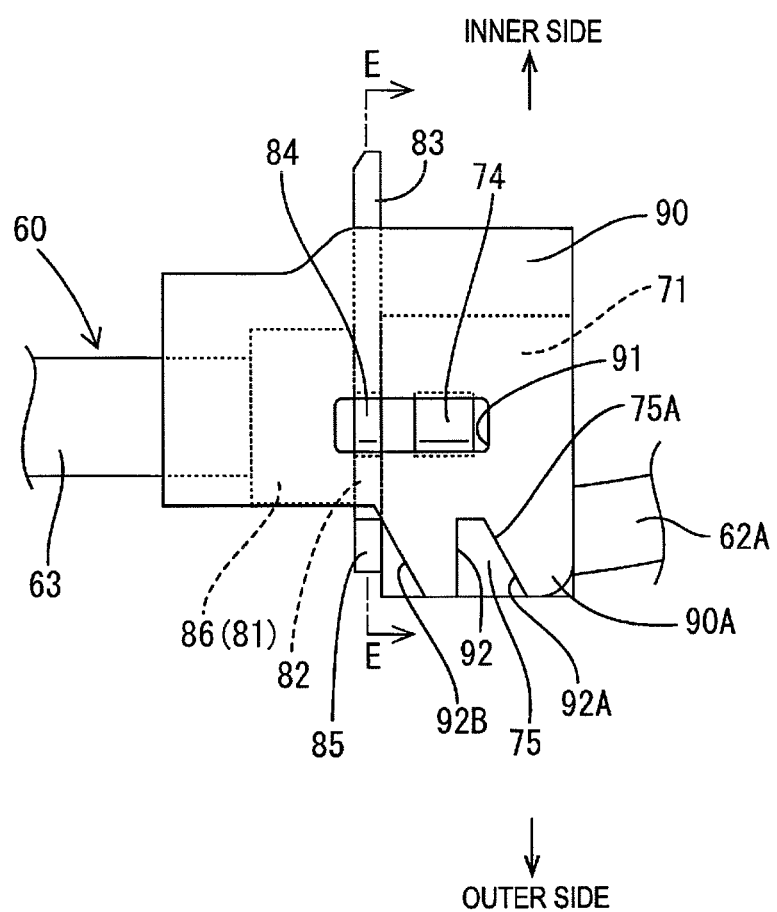
FIG. 8 is a view illustrating the light source unit mounted to the mounting rib.

The housing member fitting projection 74 and the holder fitting projection 84 are inserted to the fitting hole 91. As illustrated in FIG. 8, the LED housing member 71 is inserted to the space between the mounting ribs 90 and according to this insertion, each of the housing member fitting projections 74 is inserted (fitted) to the corresponding fitting hole 91.

As illustrated in FIGS. 8 and 9, the light guide member holding member 81 is inserted to the space between the mounting ribs 90 and accordingly, each of the holder fitting projections 84 is inserted (fitted) to the corresponding fitting hole 91. Namely, in the present embodiment, the housing member fitting projection 74 and the holder fitting projection 84 are fitted to the common fitting hole 91. One fitting portion (a first fitting portion) to which the housing member fitting projection 74 is fitted and another fitting portion (a second fitting portion) to which the holder fitting projection 84 is fitted are configured as the common fitting hole 91.

As illustrated in FIG. 8, each of the housing member fitting projections 74 is inserted to the corresponding fitting hole 91 and accordingly, the LED housing member 71 is mounted to the mounting ribs 90. As illustrated in FIGS. 8 and 9, each of the holder fitting projections 84 is inserted to the corresponding fitting hole 91 and accordingly, the light guide member holder 81 is mounted to the mounting ribs 90.

The fitting hole 91 is formed in each of the mounting ribs 90. The LED housing member 71 includes the housing member fitting projections 74 each of which is fitted to each of the fitting hole 91. The light guide member holder 81 includes the holder fitting projections 84 each of which is fitted to each of the fitting hole 91.

As illustrated in FIG. 9, a distance Y1 from a projection end of one housing member fitting projection 74 to an projection end of another housing member fitting projection 74 is slightly greater than a distance X1 between the facing surfaces of the mounting ribs 90. A distance Z1 from a projection end of one holder fitting projection 84 to a projection end of another holder fitting projection 84 is slightly greater than the distance X1 between the facing surfaces of the mounting ribs 90.

As illustrated in FIG. 9, the housing member fitting projection 74 has two sloped surfaces and one sloped surface 74A provided on the inner side of the compartment has a gentler slope than the other sloped surface. The sloped surface 74A is sloped from a top portion of the housing member fitting projection 74 toward the basal end of the housing member fitting projection 74 as is close to the inner side of the compartment or the upper side in FIG. 9. With this configuration, while the LED housing member 71 is inserted to the space between the mounting ribs 90, the sloped surfaces 74A easily presses the mounting ribs 90 and accordingly, the mounting ribs 90 are smoothly deformed to be expanded to increase the distance X1 between the mounting ribs 90. Thus, the LED housing member 71 is easily and smoothly inserted to the space between the mounting ribs 90 from the opening therebetween.

The holder fitting projection 84 also has two sloped surfaces and one sloped surface 84A provided on the inner side of the compartment has a gentler slope than the other sloped surface. The sloped surface 84A is sloped from a top portion of the holder fitting projection 84 toward the basal end of the holder fitting projection 84 as is close to the inner side of the compartment or the upper side in FIG. 9. With this configuration, while the light guide member holder 81 is inserted to the space between the mounting ribs 90, the sloped surfaces 84A easily presses the mounting ribs 90 and accordingly, the mounting ribs 90 are smoothly deformed to be expanded to increase the distance X1 between the mounting ribs 90. Thus, the light guide member holder 81 is easily and smoothly inserted to the space between the mounting ribs 90 from the opening therebetween.

The plate portion 82 of the light guide member holder 81 includes an insertion portion 83 that is projected toward the lower panel 50 (toward an interior part of a vehicle). As illustrated in FIGS. 2 and 9, the insertion portion 83 is inserted through an insertion hole 51B that is formed in an upper end portion 51 of the lower panel 50 so as to be through a width direction of a vehicle. The insertion hole 51B and the space between the mounting ribs 90 have openings each of which is open toward a same direction, specifically in this embodiment, each of the openings is open to a side opposite to the lower panel 50.

With such a configuration, an insertion direction in which the insertion portion 83 is inserted to the insertion hole 51B matches an insertion direction in which the light guide member holder 81 is inserted to the space between the mounting ribs 90. The insertion direction in which the light guide member holder 81 is inserted to the space between the mounting ribs 90 is along a plate surface of the mounting rib 90. With this configuration, the light guide member holder 81 is inserted to the space between the mounting ribs 90 and accordingly, the insertion portion 83 is inserted to the insertion hole 51B. Thus, the light guide member holder 81 is positioned in the front-rear direction of a vehicle (a right-left direction in FIG. 2).

As illustrated in FIG. 7, a recess 92 is formed at a distal end portion 90A of each mounting rib 90. A housing member guide projection 75 (a housing member guide portion) is projected from each side surface of the LED housing member 71 that faces the mounting rib 90. The housing member guide projection 75 is formed to correspond to the recess 92. As the LED housing member 71 inserted to the space between the mounting ribs 90, the housing member guide projection 75 is fitted to the recess 92 and accordingly, the LED housing member 71 is positioned with respect to the lower panel 50 in the front-rear direction of a vehicle.

The recess 92 has a first sloped surface 92A (a first rib guide portion) that is sloped such that an opening end of the recess 92 is greater in its width than a bottom portion of the recess 92. The housing member guide projection 75 has a sloped surface 75A that faces the first sloped surface 92A. Namely, the first sloped surface 92A is sloped such that an opening width W1 increases as is close to the outer side of the compartment. Accordingly, the housing member guide projection 75 is easily fitted to the recess 92 from the outer side of the compartment.

When the LED housing member 71 is inserted to the space between the mounting ribs 90, each sloped surface 75A of the housing member guide projection 75 comes in contact with the corresponding first sloped surface 92A and accordingly, each housing member guide projection 75 is guided by the corresponding first sloped surface 92A. As a result, the LED housing member 71 is guided to a certain mounting position between the mounting ribs 90 by the first sloped surfaces 92A.

In the present embodiment, when the housing member fitting projection 74 is inserted to the fitting hole 91 as illustrated in FIG. 8, the LED housing member 71 is in the certain mounting position. The recess 92 is provided on each of the mounting ribs 90 and the housing member guide projection 75 is provided corresponding to each of the recesses 92. In FIG. 8, components of the lower panel 50 other than the mounting ribs 90 are not illustrated.

The distal end portion 90A of the mounting rib 90 has a second sloped surface 92B (a second rib guide portion) on an end surface close to the rear side of a vehicle (a left side in FIG. 7). The second sloped surface 92B is sloped such that a basal end thereof is closer to the rear side of a vehicle than a tip end thereof that is close to the recess opening of the recess 92. A holder guide projection 85 (a holder guide portion) is provided on an end portion of the plate portion 82 that is close to the outer side of the compartment.

With this configuration, when the light guide member holder 81 is inserted to the space between the mounting ribs 90, the holder guide projection 85 is guided by the second sloped surface 92B. As a result, the light guide member holder 81 is guided to a certain mounting position between the mounting ribs 90.

When each holder fitting projection 84 is inserted to the corresponding fitting hole 91 as illustrated in FIG. 8, the light guide member holder 81 is in the certain position. The second sloped surface 92B is provided on each of the mounting ribs 90 and the holder guide projection 85 is provided corresponding to each of the second sloped surfaces 92B.

In the present embodiment, the LED housing member 71 and the light guide member holder 81 are connected to each other. As illustrated in FIGS. 6 and 9, the light guide member holder 81 includes a connection projection 87 that is formed in a U-shape. The connection projection 87 is fitted to the fitting opening 73 formed in the LED housing member 71 so that the LED housing member 71 and the light guide member holder 81 are connected or assembled to each other.

As illustrated in FIGS. 2, 6 and 9, the connection projection 87 is projected from a facing surface 82A of the plate portion 82 that faces the LED housing member 71 toward the LED housing member 71. The facing surface 82A is a surface of the plate portion 82 that is opposite to a surface on which the cylindrical portion 86 is formed. The connection projection 87 may be projected from the LED housing member 71 toward the light guide member holder 81 and the opening 73 may be formed in the light guide member holder 81.

As illustrated in FIG. 9, the connection projection 87 is formed in a U-shape having a smaller size than the opening 73. The connection projection 87 is formed in a U-shape having an open side at the outer side of the compartment. Namely, the connection projection 87 has the open side at a lower side in FIG. 9 or at an upstream side of the insertion direction in which the light guide member holder 81 is inserted. Each of the U-shaped connection projection 87 and the U-shaped opening 73 includes two end portions and a bottom portion therebetween. A distance between the two end portions of the connection projection 87 is slightly smaller than the two end portions of the opening 73. As illustrated in FIG. 9, the connection projection 87 is provided to substantially overlap the cylindrical portion 86 in a plan view.

The opening 73 is formed in the wall 72 corresponding to the connection projection 87. A part of an opening edge of the opening 73 close to the lower panel 50 is cut away and an inner peripheral surface 73A thereof is formed in a U shape. A part of the opening edge of the opening 73 is cut away and open in the mounting direction in which the LED housing member 71 is mounted to the lower panel 50 or open toward the upper side in FIG. 9. The open side of the opening 73 is provided on a side opposite to the bottom portion. With this configuration, when the LED housing member 71 is mounted to the lower panel 50 after the light guide member holder 81 is mounted to the lower panel 50 as illustrated in FIG. 9, the open side of the U-shaped opening 73 comes closer to the open side of the U-shaped connection projection 87 with the open sides of the connection projection 87 and the opening 73 facing each other. Accordingly, the connection projection 87 is inserted to the opening 73 from the upper side in FIG. 9. In FIG. 9, the mounting direction in which the LED housing member 71 is mounted is illustrated by an arrow T1.

After the light guide member holder 81 is mounted to the lower panel 50, the LED housing member 71 can be inserted to the space between the mounting ribs 90 and mounted to the lower panel 50. Accordingly, the connection projection 87 is fitted to the opening 73. The openings of the insertion hole 51B and the opening of the space between the mounting ribs 90 and the open side of the U-shaped connection projection 87 are open to the same side. Accordingly, the fitting direction in which the opening 73 is fitted to the connection projection 87 matches the mounting direction in which the LED housing member 71 is mounted to the lower panel 50 (an interior part of a vehicle). In the present embodiment, as illustrated in FIG. 7, after the LED housing member 71 and the light guide member holder 81 are connected to each other, the connected LED housing member 71 and the light guide member holder 81 may be mounted to the lower panel 50.

The connection projection 87 is fitted to the opening 73 and in such a condition, a part of the outer peripheral surface 87A of the connection projection 87 comes in contact with a part of the inner surface 73A of the opening 73. Accordingly, as illustrated in FIG. 9, in the state that the LED housing member 71 and the light guide member holder 81 are connected to each other, a part of the inner peripheral surface 87B of the connection projection 87 and a part of the inner peripheral surface 73A of the opening 73 surround the LED 61 in a plan view. In FIG. 9, the connection projection 87 that is fitted to the opening 73 is illustrated by a double-dot chain line. In the state that the connection projection 87 is fitted to the opening 73, the light emitting surface 61A of the LED 61 is provided to correspond to the mounting hole 86A as illustrated in FIG. 2. Namely, the light emitting surface 61A faces the end surface 63A that is a light exit surface of the light guide member 63.

Effects of the present embodiment will be explained. In the present embodiment, each of the LED housing member 71 and the light guide member holder 81 is independently mounted to the mounting ribs 90. Accordingly, each of the LED 61 and the light guide member 63 is independently mounted to the vehicular door trim 10. The LED housing member 71 is connected to the light guide member holder 81. Upon the connection of the LED housing member 71 and the light guide member holder 81, the LED 61 and the light guide member 63 are arranged such that the LED 61 faces the end surface 63A that is the light entrance portion of the light guide member 63. Accordingly, the mounting of the LED 61 and the light guide member 63 to the vehicular door trim 10 enables the LED 61 and the light guide member 63 to be configured as a unit. Therefore, positional displacement of the LED 61 and the end surface 63A is less likely to occur.

The mounting member includes a pair of mounting ribs 90 that extend from the vehicular door trim 10 and are provided to face each other. The LED housing member 71 includes the housing member fitting projections 74 each of which is fitted to the fitting hole 91 that is provided in each of the mounting ribs 90. The light guide holder 81 includes the holder fitting projections 84 each of which is fitted to the fitting hole 91 that is provided in each of the mounting ribs 90. The LED housing member 71 is inserted to the space between the mounting ribs 90 and this insertion enables the housing member fitting projection 74 to be fitted to the corresponding fitting hole 91. The light guide member holder 81 is inserted to the space between the mounting ribs 90 and this insertion enables the holder fitting projection 84 to be fitted to the corresponding fitting hole 91.

With this configuration, the LED housing member 71 and the light guide member holder 81 are inserted to and arranged in the space between the mounting ribs 90, and this enables the LED housing member 71 and the light guide member 81 to be mounted to the vehicular door trim 10. Accordingly, the light source unit 60 is surely fixed to the door trim 10. In the present embodiment, the light source unit 60 is mounted to the door trim 10 without requiring any additional mounting parts and with a simple configuration.

The housing member fitting projection 74 and the holder fitting projection 84 are fitted to a common fitting hole.

With this configuration, both of the housing member fitting projection 74 and the holder fitting projection 84 are inserted to the common fitting hole 91, and this insertion enables both of the LED housing member 71 and the light guide member holder 81 to be mounted to the mounting ribs 90. If a fitting hole is provided corresponding to each of the housing member fitting projections 74 and the holder fitting projections 84, the fitting holes may be formed with positional gaps and this may cause positional displacement of the LED housing member 71 and the light guide member holder 81. In the present embodiment, the housing member fitting projection 74 and the holder fitting projection 84 are inserted to the common fitting hole 91. With this configuration, the LED housing member 71 and the light guide member holder 81 are surely positioned and the number of coupling holes is reduced.

The LED housing member 71 includes the housing member guide projections 75 each of which is guided by the first sloped surface 92A that is provided on each of the mounting ribs 90. The housing member guide projection 75 is guided by the corresponding first sloped surface 92A and accordingly, the LED housing member 71 is guided to the certain mounting position between the mounting ribs 90. The light guide member holder 81 includes the holder guide projections 85 each of which is guided by the second sloped surface 92B that is provided on each of the mounting ribs 90. The holder guide projection 85 is guided by the corresponding second sloped surface 92B and accordingly, the light guide member holder 81 is guided to the certain mounting position between the mounting ribs 90.

Thus, each of the LED housing member 71 and the light guide member holder 81 is guided to the corresponding certain mounting position and this facilitates the mounting operation.

The light guide member holder 81 includes the insertion portion 83 that is inserted to the insertion hole 51B formed in the vehicular door trim 10. The insertion direction in which the insertion portion 83 is inserted to the insertion hole 51B matches the insertion direction in which the light guide member holder 81 is inserted to the space between the mounting ribs 90.

With this configuration, according to the insertion of the light guide member holder 81 to the space between the mounting ribs 90, the insertion portion 83 is inserted to the insertion hole 51B and this surely positions the light guide member holder 81.

In the present embodiment, after the LED housing member 71 and the light guide member holder 81 are mounted to the mounting ribs 90, the LED housing member 71 and the light guide member holder 81 are configured as a unit. The insertion portion 83 is provided on an end portion of the unit that is close to the inner side of the compartment and the housing member guide projections 75 and the holder guide projections 85 are provided on an end portion of the unit that is close to the outer side of the compartment. With this configuration, each of the LED housing member 71 and the light guide member holder 81 is fixed to the lower panel 50 by at least two end portions of the LED housing member 71 and the light guide member holder 81 including one end portion close to the inner side of the compartment and the another end portion close to the outer side of the compartment. This surely fixes the LED housing member 71 and the light guide member holder 81 to the lower panel 50.

The connection projection 87 is formed on the facing surface 82A of the plate portion 82 of the light guide member holder 81. The connection projection 87 is projected toward the LED housing member 71 and formed in a U-shape. The opening 73 is formed in the LED housing member 71 corresponding to the connection projection 87 and the connection projection 87 is fitted to the opening 73. A part of the peripheral edge of the opening 73 is cut away and open and the inner peripheral surface 73A of the opening 73 is formed in a U-shape having an open side at the cut away portion. The connection projection 87 is inserted to the opening 73 from the open side of the opening 73 with the open sides of the U-shapes of the connection projection 87 and the opening 73 facing each other. Accordingly, the connection projection 87 is fitted to the opening 73. The fitting direction in which the opening 73 is fitted to the connection projection 87 matches the mounting direction in which the LED housing member 71 or the light guide member holder 81 is mounted to the vehicular door trim 10. The fitting of the connection projection 87 and the opening 73 connects the LED housing member 71 and the light guide member holder 81.

In the present embodiment, the fitting of the connection projection 87 and the opening 73 connects the light guide member holder 81 and the light guide member holder 81. The connection portion between the LED housing member 71 and the light guide member holder 81 is configured with a fitting mechanism of the U-shaped connecting projection 87 and the U-shaped opening 73. This surely fixes the positions of the LED housing member 71 and the light guide member holder 81. The positional displacement of the LED 61 and the end surface 63A that is a light entrance portion of the light guide member 63 is less likely to occur. Also, light from the LED 61 is less likely to leak from the connection portion between the LED housing member 71 and the light guide member holder 81.

In the present embodiment, light emitted from the LED 61 is exited to the end surface 63A of the light guide member 63 through the opening 73 that is formed in the LED housing member 71. If any gap is generated between the LED housing member 71 and the plate portion 82 of the light guide member holder 81, the light emitted from the LED 61 may leak from the gap. In the present embodiment, the connection projection 87 is closely fitted to the opening 73 and accordingly, the connection projection 87 closes the gap that may be generated between the light guide member holder 81 and the plate portion 82 such as a gap S1 in FIG. 2. Therefore, light is less likely to leak from the gap.

The fitting direction in which the opening 73 is fitted to the connection projection 87 matches the mounting direction in which the LED housing member 71 or the light guide member holder 81 is mounted to the vehicular door trim 10. With this configuration, the fitting of the connection projection 87 and the opening 73 may be executed in the process of mounting of the LED housing member 71 to the vehicular door trim 10.

In the present embodiment, the opening 73 and the connection projection 87 are fitted to each other. The LED housing member 71 and the light guide member holder 81 are connected to each other by using the opening 73 that is the light exit portion of the LED housing member 71. Therefore, another opening portion is not required to be formed for being fitted to the connection projection 87. This further simplifies the configuration.

The connection projection 87 is formed in a U-shape so as to surround the LED 61. With this configuration, the light emitting surface 61A of the LED 61 is not covered by the connection projection 87 and therefore, the light from the light emitting surface 61A is surely directed to the light guide member 63.

The outer peripheral surface 87A of the connection projection 87 formed in a U-shape comes in contact with the inner peripheral surface 73A of the opening 73 formed in a U-shape. With this configuration, the connection projection 87 is positioned precisely with respect to the opening 73. Especially, the connection projection 87 is precisely positioned in the right-left direction in FIG. 9.

[Other Embodiments]

The present invention is not limited to the embodiments as described above with reference to the drawings. For example, the present invention may include following embodiments.

(1) In the above embodiment, the vehicular door trim 10 is an example of a vehicular interior part to which the light source unit 60 is mounted. However, it is not limited thereto. For example, a quarter trim or a deck side trim may be an example of the vehicular interior part. A component to which the LED housing member 71 and the light guide member holder 81 are mounted to is not necessarily the decorative panel 41 but may be altered if necessary.

(2) In the above embodiments, an object to be illuminated with light from the light source unit 60 is the handle housing member 30 and the surface 22 of the main body 12. However, it is not limited thereto. An object to be illuminated with light from the light source unit 60 may be altered if necessary, and may be a switch base or a door pocket.

(3) In the above embodiment, the LED 61 is used as a light source. However, it is not limited thereto. For example, various kinds of light sources such as a filament lamp (filament bulb), a fluorescent tube, a halogen lamp may be used as the light source.

(4) The light guide member 63 is not necessarily formed in a bar-like shape but may be formed in a flat plate. The light entrance portion and the light exit portion are not necessarily formed on the end surface 63A and the outer peripheral surface 63D in the above embodiment.

Figure 10:
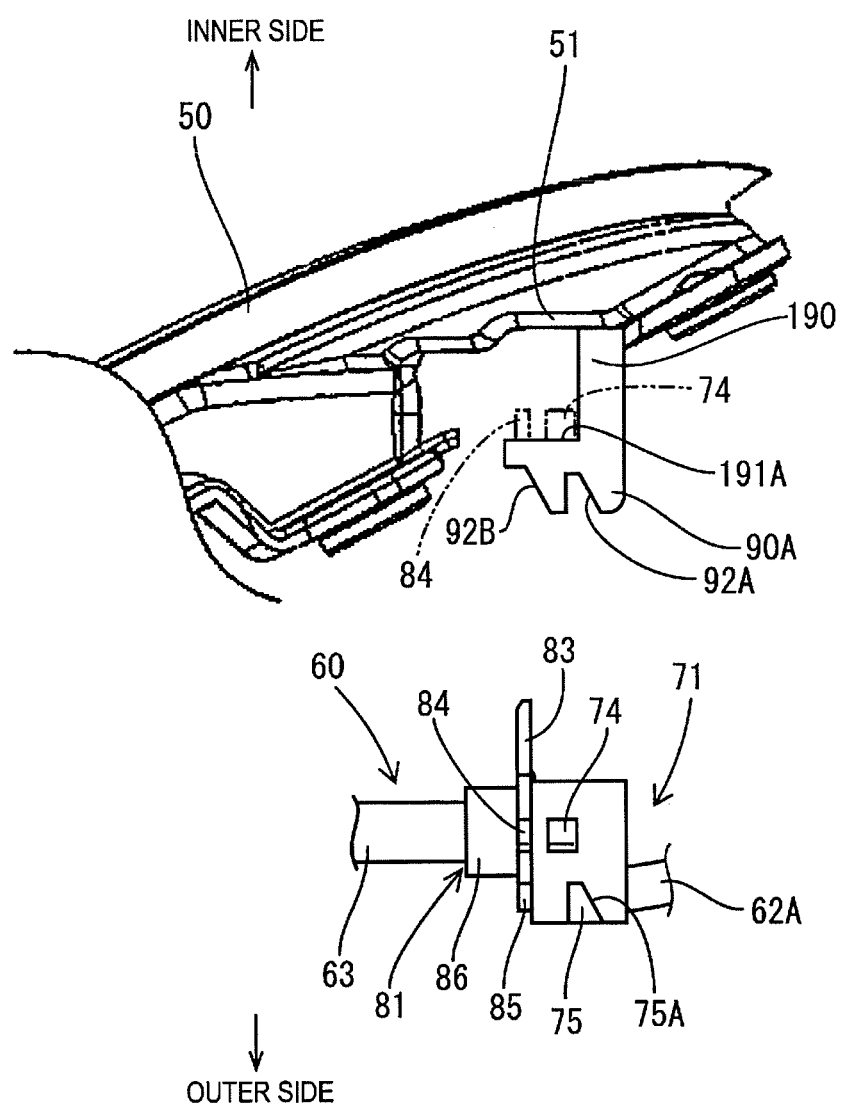
FIG. 10 is a view illustrating another embodiment.

(5) The mounting rib 90 is not necessarily formed in the shape described in the above embodiment. In the above embodiment, each of the mounting ribs 90 is formed in a same shape. However, it is not limited thereto. Each of the mounting ribs 90 may be formed in a different shape. For example, one or both of the mounting ribs 90 may be formed in a shape as illustrated in FIG. 10.

In the above embodiment, the fitting hole 91 has a peripheral edge over its entire periphery. As illustrated in FIG. 10, a mounting rib 190 may be formed in substantially an L shape. A base portion extends from the lower panel 50 and a fitting portion extends substantially perpendicularly from the base portion. The housing member fitting projection 74 and the holder fitting projection 84 are stopped by an inner facing surface 191A of the fitting portion of the mounting rib 190 that faces the lower panel 50. In FIG. 10, the housing member fitting projection 74 and the holder fitting projection 84 that are stopped by the facing surface 191A are illustrated by a double-dot chain line.

Figure 11:
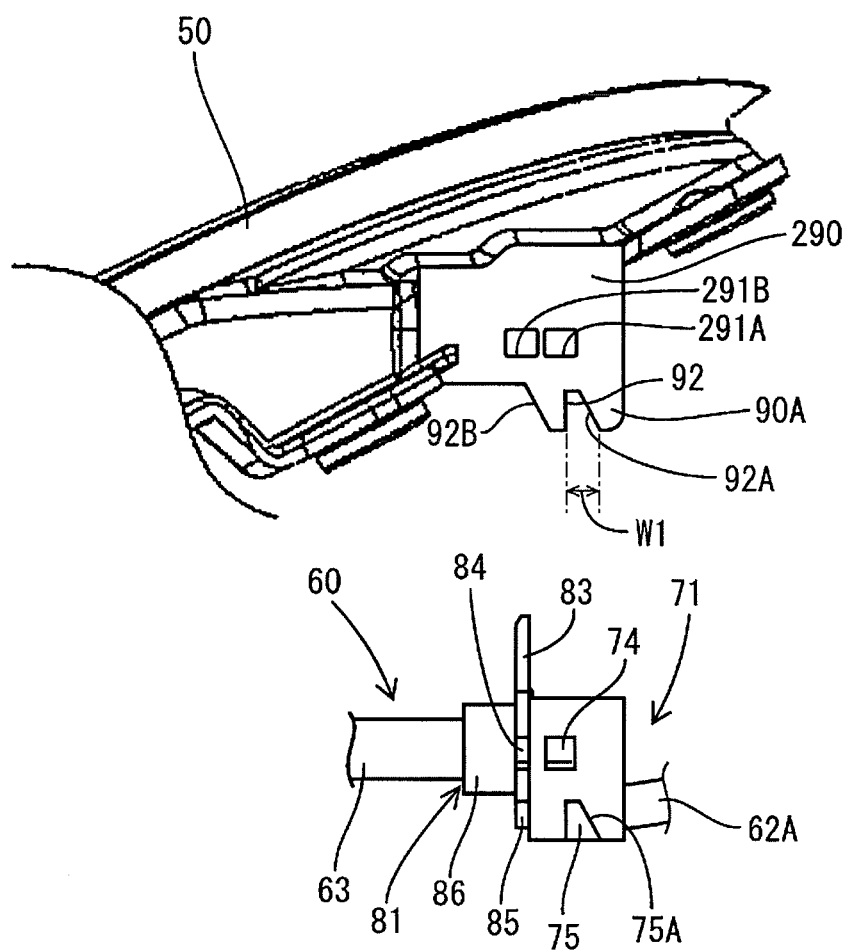
FIG. 11 is a view illustrating an additional embodiment.

(6) In the above embodiment, the housing member fitting projections 74 and the holder fitting projection 84 are fitted to the common fitting hole 91. However, it is not limited thereto. As illustrated in FIG. 11, a mounting rib 290 may include a fitting hole 291A (a first rib fitting portion) and a fitting hole 291B (a second rib fitting portion). The housing member fitting projection 74 is fitted to the fitting hole 291A and the holder fitting projection 84 is fitted to the fitting hole 291B.

(7) The connection projection 87 is not necessarily formed in a U-shape. For example, the connection projection 87 may be formed in a ring. The opening 73 is not necessarily formed in the shape as illustrated in the above embodiment but may be formed in a circular opening without having an open side.

What is claimed is:

1. A light source unit assembly comprising:
   a light source;
   a light guide member including a light entrance portion which light from the light source enters and a light exit portion from which the light entering the light entrance portion exits;
   a light source housing member housing the light source;
   a light guide member holder supporting an end portion of the light guide member including the light entrance portion; and
   a mounting member provided to a vehicular interior part and to which each of the light source housing member and the light guide member holder is independently mounted, wherein each of the light source housing member and the light guide member holder has a connecting portion with which the light source housing member and the light guide member holder are connected to each other such that the light entrance portion faces the light source.

2. The light source unit assembly according to claim 1, wherein
the mounting member has a first fitting portion and a second fitting portion,
the light source housing member has a housing member fitting portion that is fitted to the first fitting portion, and
the light guide member holder has a holder fitting portion that is fitted to the second fitting portion.

3. The light source unit assembly according to claim 2, wherein
the light source housing member has a facing surface and the light guide member holder has a facing surface and the facing surfaces face each other,
the facing surface of the light source housing member has a housing opening and the facing surface of the light guide member holder has a holder opening,
the light source faces the housing opening and the light entrance portion faces the holder opening,
the housing opening and the holder opening are communicated with each other to provide a communication portion, and
light from the light source enters the light entrance portion through the communication portion.

4. The light source unit assembly according to claim 1, wherein
the light source housing member has a facing surface and the light guide member holder has a facing surface and the facing surfaces face each other,
the facing surface of the light source housing member has a housing opening and the facing surface of the light guide member holder has a holder opening,
the light source faces the housing opening and the light entrance portion faces the holder opening,
the housing opening and the holder opening are communicated with each other to provide a communication portion, and light from the light source enters the light entrance portion through the communication portion.

5. The light source unit assembly according to claim 4, wherein
the light source is arranged inside the facing surface of the light source housing member, and
the light entrance portion is arranged inside the facing surface of the light guide member holder.

6. A light source unit assembly comprising:
a light source;
a light guide member including a light entrance portion which light from the light source enters and a light exit portion from which the light entering the light entrance portion exits;
a light source housing member housing the light source;
a light guide member holder supporting an end portion of the light guide member including light entrance portion; and
a mounting member provided to a vehicular interior part and to which each of the light source housing member and the light guide member holder is independently mounted, wherein
each of the light source housing member and the light guide member holder has a connecting portion with which the light source housing member and the light guide member holder are connected to each other such that the light entrance portion faces the light source,
the mounting member is provided to the vehicular interior part such that a part of the mounting member is projected therefrom and the mounting member includes at least two mounting ribs that face each other,
the light source housing member and the light guide member are provided between a space between the mounting ribs,
each of the mounting ribs has a first fitting portion and a second fitting portion,
the light source housing member has at least two housing member fitting portions each of which is fitted to the first fitting portion of each mounting rib, and
the light guide member holder has at least two holder fitting portions each of which is fitted to the second fitting portion of each mounting rib.

7. The light source unit assembly according to claim 6, wherein
the first fitting portion and the second fitting portion, that are provided on at least one of the mounting ribs, are configured with a first fitting hole and a second fitting hole, respectively,
one of the housing member fitting portions that corresponds to the first fitting hole is a housing member fitting projection that is inserted to the first fitting hole, and
one of the holder fitting portions that corresponds to the second fitting hole is a holder fitting projection that is inserted to the second fitting hole.

8. The light source unit assembly according to claim 7, wherein the first fitting hole and the second fitting hole are configured with a common fitting hole.

9. The light source unit assembly according to claim 8, wherein the common fitting hole is an elongated rectangular shape such that the housing member projection and the holder fitting projection are arranged in an elongated direction of the common fitting hole.

10. The light source unit assembly according to claim 7, wherein each of the first fitting hole and the second fitting hole is configured with an independent fitting hole.

11. The light source unit assembly according to claim 6, wherein
each of the mounting ribs has a first rib guide portion and a second rib guide portion,
the light source housing member has at least two housing member guide portions each of which is guided by the first rib guide portion of each mounting rib,
the light guide member holder has at least two holder guide portions each of which is guided by the second rib guide portion of each mounting rib, and
each housing member guide portion is guided by the first rib guide portion of each mounting rib and each holder guide portion is guided by the second rib guide portion of each mounting rib and each of the light source housing member and the light guide member is arranged in a mounting position between the mounting ribs.

12. The light source unit assembly according to claim 11, wherein
the light guide member holder includes a plate portion having a plate opening and a cylindrical portion connected to the plate opening, and the end portion of the light guide member is fitted to the cylindrical portion,
the light source housing member is a box shape having a box opening on a first surface that faces the light source and the plate opening of the plate portion, and the light source faces the light entrance portion of the light guide member and light from the light source exits through the box opening and the plate opening to the light entrance portion, each of the first rib guide portion and the second rib guide portion is a recess that is defined in each of the mounting ribs, and the holder guide portion is a projection that is provided on side surfaces of the plate portion, the housing member guide portion is a projection that is provided on side surfaces of the light source housing member, and the side surfaces of the light source housing member are provided to sandwich the first surface having the box opening.

13. The light source unit assembly according to claim 6, wherein the light guide member holder includes a plate portion having a plate opening and a cylindrical portion connected to the plate opening, and the end of the light guide member is fitted to the cylindrical portion, and the light source housing member is a box shape having a box opening on a first surface that faces the light source and the plate opening of the plate portion, and the light source faces the light entrance portion of the light guide member and light from the light source exits through the box opening and the plate opening to the light entrance portion.

14. The light source unit assembly according to claim 6, wherein the mounting ribs define a space therebetween having a space opening from which the light guide member holder is inserted, and the light guide member holder has an insertion portion that is provided on a side of the mounting ribs opposite to the space opening and that is inserted to an insertion hole defined in the vehicular interior part.

15. A light source unit assembly comprising:

a light source;

a light guide member including a light entrance portion which light from the light source enters and a light exit portion from which the light entering the light entrance portion exits;

a light source housing member housing the light source;

a light guide member holder supporting an end portion of the light guide member including light entrance portion; and a mounting member provided to a vehicular interior part and to which each of the light source housing member and the light guide member holder is independently mounted, wherein each of the light source housing member and the light guide member holder has a connecting portion with which the light source housing member and the light guide member holder are connected to each other such that the light entrance portion faces the light source, the light source housing member and the light guide member holder have facing surfaces that face each other, the connecting portion of one of the light source holding member and the light guide member holder is a U-shaped projection provided a corresponding one of the facing surfaces thereof, the U-shaped projection is projected from the one of the facing surfaces toward another one of the facing surfaces and provided a U-shape having an open side, the U-shaped projection has open side ends and a bottom side portion, the connecting portion of the other of the light source holding member and the light guide member holder is a connection opening having an peripheral edge a part of which is cut away and that is provided a U-shape having an open side, the U-shaped peripheral edge has open side ends and a bottom side portion, and the open side ends of the one of the light source holding member and the light guide member are in contact with the bottom side portion of the other one thereof.

16. The light source unit assembly according to claim 15, wherein the U-shaped projection is provided the light guide member holder and the U-shaped opening is provided the light source housing member. between the opening side ends of the U-shaped opening.

17. The light source unit assembly according to claim 15, wherein the opening side ends of the U-shaped projection have a distance therebetween that is smaller than a distance between the opening side ends of the U-shaped opening.

18. The light source unit assembly according to 15, wherein the mounting member includes at least two mounting ribs that face each other and define a space therebetween having a space opening on one side of the space, and each of the light guide member holder and the light source housing member is mounted to the space from the space opening such that the connection portions of the light guide member holder and the light source housing member are connected to each other.

\* \* \* \* \*